(12) United States Patent
Schroth

(10) Patent No.: US 10,124,516 B2
(45) Date of Patent: Nov. 13, 2018

(54) TWO-DIMENSIONAL COMPOSITE COMPONENT AND METHOD AND DEVICE FOR THE PRODUCTION THEREOF

(71) Applicant: Roechling Automotive SE & Co. KG, Mannheim (DE)

(72) Inventor: Dennis Schroth, Worms (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 376 days.

(21) Appl. No.: 14/072,917

(22) Filed: Nov. 6, 2013

(65) Prior Publication Data

US 2014/0127961 A1 May 8, 2014

(30) Foreign Application Priority Data

Nov. 6, 2012 (DE) .................. 10 2012 220 180

(51) Int. Cl.
*B29C 45/14* (2006.01)

(52) U.S. Cl.
CPC ........ *B29C 45/14* (2013.01); *B29C 45/14311* (2013.01); *B29C 45/14795* (2013.01); *B29C 2045/14803* (2013.01); *Y10T 428/249958* (2015.04); *Y10T 442/674* (2015.04)

(58) Field of Classification Search
None
See application file for complete search history.

(56) References Cited

U.S. PATENT DOCUMENTS 6,375,699 B1   4/2002   Beck

FOREIGN PATENT DOCUMENTS

| DE | 10 2008 052 000 A1 | 4/2010 | |
|---|---|---|---|
| WO | 2010012808 A1 | 2/2010 | |
| WO | 2011095536 A1 | 8/2011 | |
| WO | WO2011095536 | * | 8/2011 |

* cited by examiner

*Primary Examiner* — Jeffrey M Wollschlager
*Assistant Examiner* — Armand Melendez
(74) *Attorney, Agent, or Firm* — Prince Lobel Tye LLP

(57) ABSTRACT

The present invention relates to a method for producing a two-dimensional composite component (150) having a porous basic component (152) and an injection molded component (154) rigidly joined to the basic component (152), said method comprising the following steps: introduction of the mat-like or panel-like basic component (152), comprising two mutually spaced-apart base sides (152*b*1, 152*b*2) and a circumferential narrow side (152*s*) joining the base sides (152*b*1, 152*b*2), into a basic component cavity (114) of a molding tool (112), which further comprises an injection molding cavity (116), closure of the molding tool (112), so that at least a portion (152*s*) of the basic component (152) forms a portion of a wall of the injection molding cavity (116), and injection of injection molding material (156) into the injection molding cavity (116), and formation thereby of the injection molding component (154) and joining of the injection molding component (154) to the basic component (152), wherein upon closure of the molding tool (112) before the injection molding material (156) is injected, the entire region (152*s*), formed by the basic component (152), of the wall of the injection molding cavity (116) is formed by the narrow side (152*s*) of the basic component (152).

8 Claims, 1 Drawing Sheet

Figure 1:
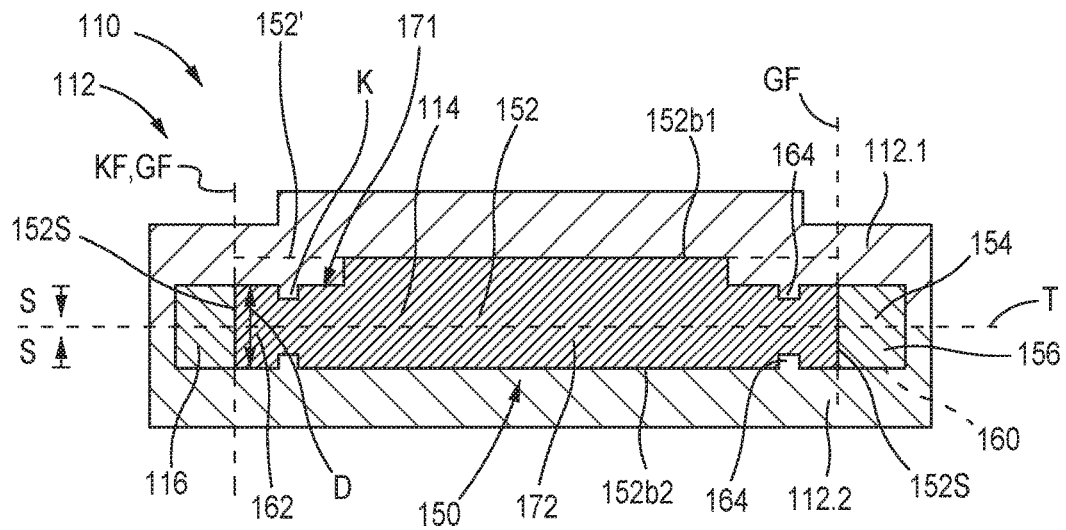

TWO-DIMENSIONAL COMPOSITE COMPONENT AND METHOD AND DEVICE FOR THE PRODUCTION THEREOF

CROSS REFERENCE TO RELATED APPLICATION

This application is claims the benefit of German Patent Application No. 10 2012 220 180.7 filed on Nov. 6, 2012, the disclosure of which is incorporated herein in its entirety by reference.

According to a first aspect, the present invention relates to a method for producing a two-dimensional composite component having a porous basic component and an injection moulded component which is rigidly joined to the basic component, the method comprising the following steps: introduction of the mat-like or panel-like basic component which comprises two mutually spaced-apart base sides and a circumferential narrow side joining the base sides together, into a basic component cavity of a moulding tool which also has an injection moulding cavity, closure of the moulding tool so that at least a portion of the basic component forms a portion of a wall of the injection moulding cavity, and injection of injection moulding material into the injection moulding cavity and formation thereby of the injection moulded component and joining of the injection moulded component to the basic component.

Composite components produced according to this method are often used in the automobile sector, where the porous material of the basic component can be used for sound absorption, for example.

A method of this type is disclosed, for example, in DE 10 2010 003 656 A1 which describes a method in which the narrow side of a porous panel-like basic component is overmoulded with injection moulding material so that the resulting injection moulded component engages around the peripheral narrow side of the basic component and is thereby joined positively thereto. The fact that injection moulding material also penetrates at least into the pores of the basic component in a joining region of said basic component which adjoins a contact surface between basic component and injection moulded component contributes to rigidly joining the basic component to the injection moulded component, in addition to the previously mentioned (macroscopic) positive engagement; this can be referred to as an additional "microscopic" positive engagement.

Hitherto, it has been assumed in the prior art that in order to produce an adequately rigid join between the basic component and the injection moulded component, it was necessary for the injection moulded component to be in contact with the basic component at least on one of the base sides, and preferably for it to engage around the basic component.

Consequently, in the case of composite components produced according to the prior art method, at least one region of one of the base sides of the basic component is always covered by the injection moulded component and thus it cannot contribute to sound absorption, or can only contribute to a very limited extent.

Therefore, the object of the present invention is to develop the known method to improve the sound-absorbing characteristic of the resulting composite component.

For this purpose, the invention provides that in the generic method, when the moulding tool is closed before the injection moulding material is injected, the entire region, formed by the basic component, of the wall of the injection moulding cavity is formed by the narrow side of the basic component.

The injection moulding material is thus directly injected frontally onto the basic component which is often also referred to as an inlay. As a result, the basic component remains acoustically effective on both sides. Appropriate tests carried out by the Applicant have surprisingly shown that this can produce a sufficiently rigid join between basic component and injection moulded component.

The injection moulded component of the composite component produced thus can be used, for example, to provide fastening structures for attachment of the composite component to a motor vehicle, or to increase the stability of the composite component. For this purpose, it is preferably provided that when the moulding tool is closed, before the injection moulding material is injected, the region, formed by the basic component, of the wall of the injection moulding cavity comprises a region of the narrow side of the basic component, which region extends over the entire circumference of the basic component, and preferably comprises the entire narrow side. In this case, in the resulting composite component, the narrow side of the basic component is in contact with the injection moulded component over the entire circumference, preferably over the entire narrow side of the basic component.

In the present context, "two-dimensional" means that a thickness of the composite component, i.e. a dimension in a local thickness direction which can differ for different points of the composite component, is always significantly smaller than the dimensions of the composite component in the two other spatial directions orthogonal to the local thickness direction. However, this does not exclude the two-dimensional composite component from being curved and thus from having overall a three-dimensional structure, although on the other hand, planar composite components should not be ruled out either.

To produce a desired shape of the composite component, it can be provided in particular that the method comprises the further step of shaping the basic component under the influence of pressure and heat, this step preferably overlapping time-wise with the step of injecting injection moulding material, in order to shorten the production duration of the composite component.

When the injection moulding material is injected onto the narrow side of the basic component, this material enters the pores in the basic component at least in a specific joining region, which results in the production of a rigid join between basic component and injection moulded component.

It may be desirable to allow the penetration of injection moulding material into the basic component only as far as a particular distance from the narrow side of the basic component, for example in order to retain desirable acoustic characteristics inside the basic component. For this purpose, it can be further provided that before and/or during the injection of the injection moulding material into the injection moulding cavity, for example upon closure of the moulding tool, the basic component is compressed to a greater extent, preferably perpendicularly to one of the base sides or to the base sides, along a predetermined contour which is at a distance from a portion of the narrow side of the basic component, which portion is associated with the contour and contributes to the wall of the injection moulding cavity, and which predetermined contour preferably runs substantially parallel to this associated portion, than in a region between the predetermined contour and the associated portion of the narrow side.

As a result of the compression of the basic component, for example by suitable projections in the moulding tool, the pores in the basic component can be reduced locally along the predetermined contour, and thus it is possible to prevent injection moulding material from penetrating into an inner region of the basic component.

Alternatively or in addition, a penetration of this type of the injection moulding material into an inner region of the basic component can also be prevented or reduced in that the injection moulding material is injected at a relatively low speed which is adapted to the shape of the basic component and of the injection moulding cavity and also to the pore size of the basic component and can be determined by appropriate tests.

In particular, if the mat-like or panel-like basic component is to be formed in a three-dimensional manner in the method, it can be provided that the method further comprises the step of heating the basic component before it is introduced into the moulding tool, so that it is easier to shape.

According to a further aspect, the present invention relates to a device for implementing the method according to the invention, the device comprising a moulding tool having a basic component cavity for a mat-like or panel-like basic component which comprises two mutually spaced-apart base sides and a circumferential narrow side joining the base sides together, and having an injection moulding cavity which is connected to and adjoins the basic component cavity along a boundary surface.

A generic device is known from the document mentioned in the introduction.

The object of the invention, to develop the known device so that the acoustic characteristics of the composite component produced therein are improved, is achieved according to this aspect in that, in the generic device, the moulding tool is configured such that when it is closed and the basic component has been introduced, the boundary surface is formed exclusively by the narrow side of the basic component.

As long as the basic component has not been introduced, the above-mentioned boundary surface can be an imaginary (at least partly not directly visible) boundary surface which can, however, be reconstructed in most cases using the shape of the basic component cavity which is adapted to the shape of the basic component.

It is possible, by the configuration according to the invention of the moulding tool, for the injection moulded component to be injected only onto the narrow side of the basic component and thus for it to impair the acoustic characteristics of the porous basic component to a significantly lesser extent compared to the device known from the prior art.

The device preferably comprises the basic component introduced into the basic component cavity.

As explained in detail above with reference to the method, during the injection procedure, to prevent injection moulding material from penetrating to an undesirable depth into the basic component, it can be provided that at least one moulding tool part, preferably a plurality or each of the moulding tool parts (for example moulding tool halves) of the moulding tool has a respective projection which projects into the interior of the basic component cavity in the closure direction of the moulding tool and is at a distance from the boundary surface and preferably extends parallel to the boundary surface, particularly preferably around the basic component along the entire boundary surface.

The expression "projecting of a projection of a moulding tool part in the closure direction" is understood as meaning that the projection extends in a direction which has a component parallel to the direction into which the respective moulding tool part is moved relative to the other moulding tool part during closure of the moulding tool. The projection preferably extends precisely in the respective closure direction, since in this way, during closure of the moulding tool, force can be exerted most effectively on the basic component.

In the case of two moulding tool halves as moulding tool parts, it can be provided in particular that precisely associated with each projection of a moulding tool half is one projection of the other moulding tool half so that, in a plan view of the parting plane of the moulding tool, the two projections are provided in the same position and, in a sectional view vertical to the parting plane, they are directed towards one another, but they do not contact one another even when the moulding tool is closed, but are at a distance from one another, so that the projections form a sealing edge which compresses but does not completely displace the material of the introduced basic component during closure of the moulding tool, in order to reduce or prevent a penetration of the injection moulding material beyond the sealing edge.

Protection is also claimed for a device for implementing the method according to the invention, the device comprising a moulding tool having a basic component cavity for a mat-like or panel-like basic component which comprises two mutually spaced-apart base sides and a circumferential narrow side joining the base sides together, and having an injection moulding cavity which is connected to and adjoins the basic component cavity, wherein at least one moulding tool part, preferably a plurality or each of the moulding tool parts (for example moulding tool halves) of the moulding tool having a respective projection which projects into the interior of the basic component cavity in the closure direction of the moulding tool and extends along a predetermined contour which extends at a distance from the injection moulding cavity at least along a portion of the injection moulding cavity, and which is particularly preferably closed.

In this manner, a device having the above-mentioned advantages with regard to preventing injection moulding material from penetrating too far into the basic component can also be protected if the course of the boundary surface between basic component cavity and injection moulding cavity cannot be viewed on the basis of the moulding tool alone with certainty without considering the basic component.

According to a further aspect, the present invention relates to a two-dimensional composite component which comprises a mat-like or panel-like porous basic component having two mutually spaced-apart base sides and a circumferential narrow side which joins the base sides together, and also an injection moulded component joined rigidly to the basic component along a contact surface of the basic component, pores in the basic component being at least partly filled with the material of the injection moulded component in a joining region, adjoining the contact surface, of the basic component.

An injection moulded component of this type is known, for example, from the document mentioned in the introduction. The above-mentioned object of the invention to improve the acoustic characteristics of the composite component is further achieved according to this aspect in that on the side of the basic component, the narrow side thereof contributes exclusively to the contact surface.

In particular, it can be provided that a thickness of the composite component in a region, directly adjoining the contact surface, of the basic component is not less than or is the same size as in a region, directly adjoining the contact surface, of the injection moulded component. Thus, with the technique according to the invention, a jump in thickness does not inevitably occur at the contact surface (joining plane) between basic component and injection moulded component, which can advantageously reduce the consumption of material for the composite component or can be desirable for other reasons.

The initiatorily mentioned compression of the basic component along a predetermined contour during the production of the composite component can be represented in the composite component according to the invention in that, along a predetermined contour which is provided between at least a portion of the joining region, preferably between the entire joining region, and an adjoining inner region of the basic component which does not belong to the joining region, the basic component has a smaller thickness than in the adjoining inner region and in the joining region. The composite component thus has a recess (reduction in thickness direction) which extends along the predetermined contour.

It is preferably provided that the injection moulded component encompasses the basic component along the entire narrow side of the basic component.

The term "porous material" is understood here as any material having material-related cavities which can be formed, for example, by gaps between fibres in a jumble of fibres, by pores in a foamed material or by gaps between the stitches in a woven fabric or in a knitted fabric.

Particularly for use as a lining component in the automobile sector, it is preferred that the basic component comprises a non-woven material, preferably an LWRT material, it being possible for the composition of the material of the composite component to differ from the composition of the material of the injection moulded component. Since a join is produced according to the invention only by the "microscopic positive locking" between the injection moulding material and the porous material of the basic component, the materials also do not necessarily have to be compatible.

For example, it can be provided that polypropylene is used as the injection moulding material and a PET non-woven fabric is used as the basic component material, or polyacrylic is used as the injection moulding material and a polypropylene-based LWRT material is used as the basic component material. The injection moulding material and/or the basic component material can comprise thermoplastic polymers which can be reinforced, for example, with mineral fibres or plastics material fibres or other fillers, but they can also be non-reinforced.

The acoustic efficiency of the composite component can be maximised in that both base sides of the basic component are exposed, and are preferably fully exposed.

Figure 2:
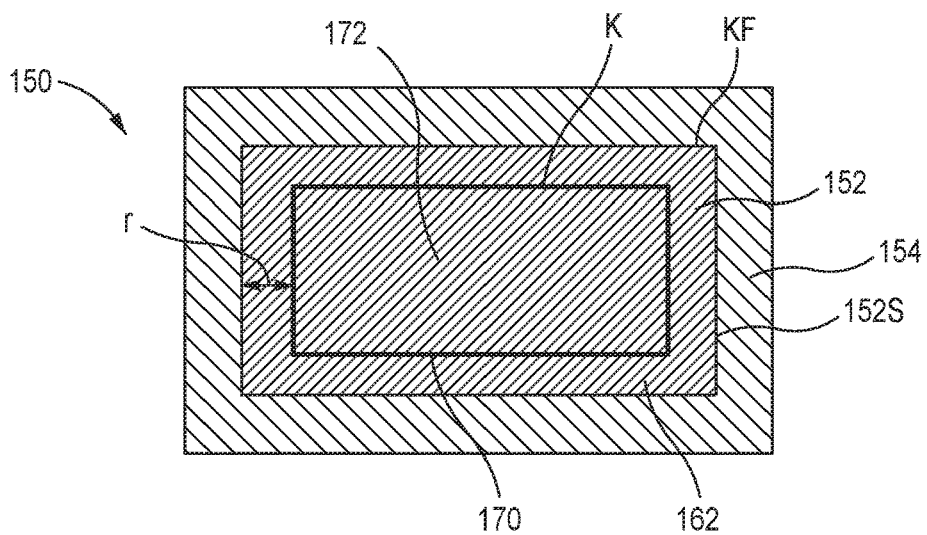
Figure 3:
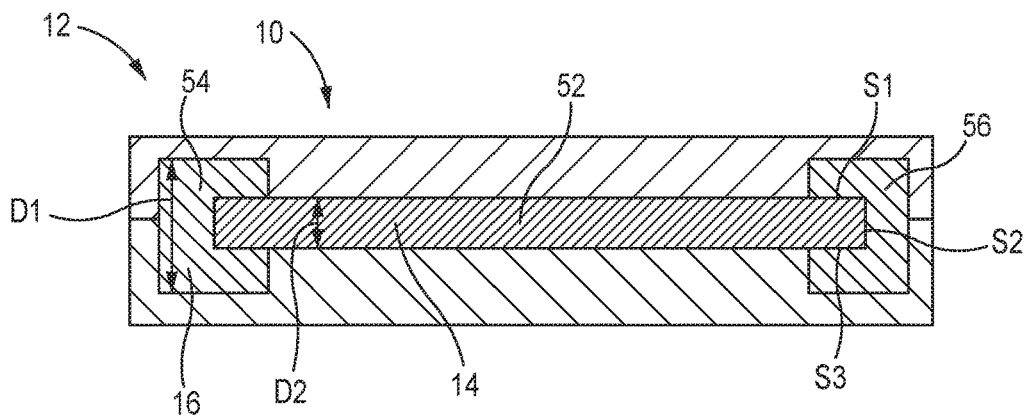

In the following, the present invention will be described with reference to a preferred embodiment which is illustrated in the accompanying figures, in which:

FIG. 1 is a sectional view of a device according to the invention, according to a first embodiment of the invention and of a composite component according to the invention produced therein, FIG. 2 is a plan view of the composite component according to the invention from FIG. 1, and FIG. 3 for comparison, is a sectional view corresponding to FIG. 1, of a moulding tool and composite component known from the prior art.

All the figures are greatly simplified schematic illustrations which are merely to illustrate the principle of the invention and, in particular, are not true to scale.

FIG. 1 shows a device 110 according to the invention for implementing the method according to the invention, which device can produce a composite component 150 according to the invention comprising a porous basic component 152 and an injection moulded component 154 joined rigidly to the basic component 152.

The device 110 comprises a moulding tool 112 which can comprise, for example, two moulding tool parts (moulding tool halves) 112.1 and 112.2 which contact one another in a parting plane T when the moulding tool is closed.

The moulding tool 112 comprises a basic component cavity 114 and an injection moulding cavity 116 which adjoins the basic component cavity 114 along an (imaginary) boundary surface, identified in the figures as GF, and is connected to the basic component cavity. It is pointed out that even if the basic component 152 is not positioned in the basic component cavity 114, the course of the boundary surface GF can be recognised in most cases from the shape of the moulding tool halves 112.1, 112.2.

The basic component cavity 114 is configured for a mat-like or panel-like basic component 152 which comprises two mutually spaced-apart base sides 152$b$1 and 152$b$2 as well as a circumferential narrow side 152$s$ joining the base sides 152$b$1 and 152$b$2 together.

In this respect, the moulding tool 112 is configured according to the invention such that when the basic component 152 has been introduced and the moulding tool 112 is closed, as shown in FIG. 1, the boundary surface GF is formed exclusively by the narrow side 152$s$ of the basic component 152.

According to the invention, the composite component 150 is produced in the device 110 such that first of all, when the moulding tool 112 is open, the mat-like or panel-like basic component 152 is introduced into the basic component cavity 114 of the moulding tool 112, the moulding tool 112 is then closed, for example, by moving the two moulding tool halves 112.1 and 112.2 towards one another in a closure direction S until they are in the position shown in FIG. 1, so that a portion of the basic component 152 forms a region of the wall of the injection moulding cavity 116.

Here, the entire region, formed by the basic component 152, of the wall of the injection moulding cavity 116 is formed exclusively by the narrow side 152$s$ of the basic component 152, so that the injection moulding material 156 is injected frontally onto the narrow side 152$s$ of the basic component 152 through a sprue 160, merely indicated in the figures, so that the injection moulded component 154 does not engage around or behind the basic component 152 and is also not in contact with the basic component along one of the base sides 152$b$1, 152$b$2.

It has surprisingly been found that the penetration of the injection moulding material 156 into the pores in the basic component 152 in a joining region 162 of the basic component 152 adjoining the narrow side 152$s$ thereof is sufficient to rigidly join the injection moulded component 154 to the porous basic component 152 and thereby to produce the two-dimensional composite component 150 according to the invention.

It can be provided that during the injection of the injection moulding material 156 into the injection moulding cavity 116, for example upon closure of the moulding tool 112, along a predetermined contour K (cf. FIG. 2) which is at a distance from a portion of the narrow side 152$s$ associated with the contour K, which portion contributes to the wall of the injection moulding cavity 116, and which contour preferably runs substantially parallel to this portion, the basic component 152 is compressed to a greater extent, in the present case is compressed to a greater extent perpendicularly to the base sides 152b1 and 152b2, than in a region 162 between the predetermined contour K and the associated portion of the narrow side 152s. In the present example, the entire narrow side 152s is associated as the "associated portion" with the (closed) contour K.

This prevents injection moulding material 156 from penetrating into an inner region 172 of the basic component 152, so that the acoustic characteristics of the basic component are affected and impaired as little as possible.

For this purpose, it is possible to provide in the moulding tool halves 112.1 and 112.2 projections 164 which project in each case into the interior of the basic component cavity 114 in the closure direction S of the moulding tool 112, are at a distance from the boundary surface GF (for example by a distance r) and preferably extend parallel to said boundary surface, particularly preferably along the entire boundary surface GF around the basic component 152, thereby producing a closed contour K. In the present case, when the moulding tool halves 112.1 and 112.2 are closed relative to one another, they are moved towards one another so that the closure directions S of the two moulding tool halves oppose one another.

The composite component 150 can have a corresponding recess 170, shown in FIG. 2, which can extend parallel to the contact surface KF between basic component 152 and injection moulded component 154, preferably along the entire contact surface KF and at a distance from said contact surface.

Provision can be made to shape the basic component 152 under the influence of pressure and heat during and/or after closure of the moulding tool 112, this step preferably overlapping with the injection step of the injection moulding material 156. As an example, the thickness of the basic component 152 can be slightly reduced in an outer region 171, a possible shape of the basic component 152' before closure of the moulding tool 112 being indicated in FIG. 1 by dashed lines. Alternatively, it can also be provided that before the moulding tool is closed, the thickness of the basic component is greater over the entire basic component than after the moulding tool is closed.

As can be seen in particular in FIG. 2, it can be provided that the injection moulded component 154 circumferentially encompasses the basic component 152 along the entire narrow side 152s thereof.

A device 10 which is known from the prior art, for example from the above-mentioned document, and is illustrated in a simplified manner in FIG. 3 comprises a moulding tool 12 with a basic component cavity 14 and an injection moulding cavity 16 which adjoins the basic component cavity, which are configured such that as a result of introducing a basic component 52 into the basic component cavity 14 and filling the injection moulding cavity 16 with injection moulding material 56, the resulting injection moulded component 54 covers and thus engages around the basic component 52 on three sides S1, S2, S3.

In contrast to this, in the case of the composite component 150 according to the invention (cf. FIGS. 1 and 2), the injection moulded component 154 is only joined to the basic component 152 along the narrow side 152s thereof. In particular, it can be provided here that a thickness D of the composite component 150 in a region of the basic component 152 directly adjoining a contact surface KF is not less than or is as great as in a region of the injection moulded component 154 directly adjoining the contact surface KF, whereas in the known composite component 50, a jump in thickness $\Delta D = D1 - D2$ necessarily occurs (cf. FIG. 3).

The basic component 152 can be, for example, an LWRT material, i.e. a material preferably constructed from several layers and based on thermoplastic fibre non-woven fabrics, while the injection moulding material 156 can be any material, preferably a thermoplastic material, for example PP or PA.

The invention allows the production of lightweight composite components 150 which are particularly effective in terms of acoustics and are particularly suitable as acoustically effective lining components for motor vehicles.

The invention claimed is:

1. Method for producing a two-dimensional composite component having a porous basic component and an injection moulded component rigidly joined to the basic component, comprising the following steps:
    introducing a mat-shaped or panel-shaped basic component comprising two mutually spaced-apart base sides and a circumferential narrow side joining together the base sides into a basic component cavity of a moulding tool, which further comprises an injection moulding cavity;
    closing the moulding tool so that at least a portion of the basic component forms a portion of a wall of the injection moulding cavity,
    upon closure of the moulding tool, shaping the basic component under the influence of pressure and heat, thereby reducing a thickness of the basic component in an entire region between a predetermined contour, which is at a distance from an associated portion of the narrow side, and the associated portion of the narrow side, and compressing the basic component to a greater extent along the predetermined contour than in the entire region between the predetermined contour and the associated portion of the narrow side, such that the predetermined contour forms a sealing edge preventing injection moulding material from penetrating beyond the sealing edge; and
    injecting injection moulding material into the injection moulding cavity and formation thereby of the injection moulding component and joining of the injection moulding component to the basic component, such that the injection moulding material enters the pores in the basic component at least in a specific joining region, thereby producing the rigid join between the basic component and the injection moulded component; wherein when the moulding tool is closed before the injection moulding material is injected, a region of the wall of the injection moulding cavity formed by the basic component, is formed by the narrow side of the basic component only.

2. Method according to claim 1, wherein when the moulding tool is closed, before the injecting step, a region of the wall of the injection moulding cavity is formed by the narrow side of the basic component which extends over the entire circumference of the basic component.

3. Method according to claim 1, wherein the step of shaping the basic component under the influence of pressure and heat, overlaps time-wise with the step of injecting injection moulding material.

4. Method according to claim 1, wherein the predetermined contour runs substantially parallel to the associated portion of the narrow side.

5. Method according to claim 1, wherein further comprising a step of heating the basic component before it is introduced into the moulding tool.

6. Method according to claim 2, wherein the region of the wall of the injection moulding cavity formed by the basic component comprises the entire narrow side of the basic component which extends over the entire circumference of the basic component.

7. Method according to claim 5, wherein the basic component is compressed perpendicularly to at least one of the base sides.

8. Method according to claim 1, wherein the predetermined contour is closed.

* * * * *